US010008896B2

(12) United States Patent
Mori et al.

(10) Patent No.: US 10,008,896 B2
(45) Date of Patent: Jun. 26, 2018

(54) ROTARY ELECTRIC MACHINE AND INSULATOR FOR ROTARY ELECTRIC MACHINE

(71) Applicant: Mitsubishi Electric Corporation, Tokyo (JP)

(72) Inventors: Shuichi Mori, Tokyo (JP); Koji Iwano, Tokyo (JP); Yuki Kohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/549,429

(22) PCT Filed: Feb. 18, 2015

(86) PCT No.: PCT/JP2015/054495
§ 371 (c)(1),
(2) Date: Aug. 8, 2017

(87) PCT Pub. No.: WO2016/132494
PCT Pub. Date: Aug. 25, 2016

(65) Prior Publication Data
US 2018/0034336 A1    Feb. 1, 2018

(51) Int. Cl.
*H02K 3/48* (2006.01)
*H02K 3/34* (2006.01)
(Continued)

(52) U.S. Cl.
CPC ............... *H02K 3/34* (2013.01); *H02K 1/148* (2013.01); *H02K 1/16* (2013.01); *H02K 3/12* (2013.01)

(58) Field of Classification Search
CPC .. H02K 3/34; H02K 3/32; H02K 1/16; H02K 1/148
(Continued)

(56) References Cited

U.S. PATENT DOCUMENTS

| 7,649,295 B2 * | 1/2010 | Fukui ..................... H02K 3/522 310/215 |
| 8,013,490 B2 * | 9/2011 | Hino ....................... H02K 3/34 310/194 |
| 2012/0286619 A1 * | 11/2012 | Tsuiki .................... H02K 3/522 310/215 |

FOREIGN PATENT DOCUMENTS

| JP | 08-019202 A | 1/1996 |
| JP | 08-223843 A | 8/1996 |

(Continued)

OTHER PUBLICATIONS

Communication dated Dec. 6, 2017 from the Korean Intellectual Property Office in counterpart application No. 10-2017-7022822.
(Continued)

*Primary Examiner* — Hanh Nguyen
(74) *Attorney, Agent, or Firm* — Sughrue Mion, PLLC; Richard C. Turner

(57) ABSTRACT

A rotary electric machine includes: a rotor rotating about an axis; a stator formed by annularly combining cores having electric wires wound therearound and placed on the outer side of the rotor in a direction orthogonal to the axis; and an insulator including an outer portion placed on the radially outer side of the stator; an inner portion placed on the radially inner side of the stator; a trunk portion coupling the outer portion and the inner portion and having the electric wire wound therearound; a recess portion formed in a portion of the outer portion facing the inner portion to accommodate the electric wire; and a wall placed at the recess portion on the side of the inner portion to partially cover the recess portion. The insulator is attached to one end portion of the cores in a direction parallel with the axis.

10 Claims, 11 Drawing Sheets

(51) Int. Cl.
  *H02K 1/14*  (2006.01)
  *H02K 1/16*  (2006.01)
  *H02K 3/12*  (2006.01)

(58) Field of Classification Search
  USPC .......................................... 310/214, 215, 71
  See application file for complete search history.

(56) References Cited

FOREIGN PATENT DOCUMENTS

| | | |
|---|---|---|
| JP | 2001-178059 A | 6/2001 |
| JP | 2001-314055 A | 11/2001 |
| JP | 2005-269755 A | 9/2005 |
| JP | 2006-187073 A | 7/2006 |
| JP | 2007-089346 A | 4/2007 |
| JP | 2008-043105 A | 2/2008 |
| JP | 2008-043107 A | 2/2008 |
| JP | 2012-105484 A | 5/2012 |

OTHER PUBLICATIONS

Decision to Grant a Patent for Japanese Patent Application No. 2015-544251, dated Mar. 13, 2017.
International Search Report for PCT/JP2015/054495 dated May 19, 2015 [PCT/ISA/210].
Written Opinion for PCT/JP2015/054495 dated May 19, 2015 [PCT/ISA/237].
Communication dated Feb. 28, 2018, from the State Intellectual Property Office of People's Republic of China in counterpart Application No. 201580076421.5.

\* cited by examiner

ROTARY ELECTRIC MACHINE AND INSULATOR FOR ROTARY ELECTRIC MACHINE

CROSS REFERENCE TO RELATED APPLICATIONS

This application is a National Stage of International Application No. PCT/JP2015/054495 filed Feb. 18, 2015, the contents of all of which are incorporated herein by reference in their entirety.

FIELD

The present invention relates to a rotary electric machine including an insulator that provides isolation between a stator core and a winding of a stator and to an insulator for a rotary electric machine.

BACKGROUND

A stator of a rotary electric machine includes a stator core that includes yokes placed annularly and fixed around the axis about which a rotor of the rotary electric machine rotates and teeth protruding in the radial direction from the yokes; and windings that are wound around the teeth ant placed is slots formed between the teeth. As described in Patent Literature 1, the stator includes insulators that provide isolation between the stator core and the windings.

CITATION LIST

Patent Literature

Patent Literature 1: Japanese Patent Application Laid-Open. No. 2008-43107

SUMMARY

Technical Problem

In a winding disposed on a core of a stator, the potential difference between the winding start portion and the winding end portion is the largest. If the winding start portion and the winding end portion are in proximity to each other due to product variations, a voltage at which discharge is started between the winding start portion and the winding end portion in the winding disposed on the core may be lowered.

An object of the present invention is to provide a rotary electric machine that can inhibit lowering of a voltage at which discharge is started in a winding disposed on a core of a stator of the rotary electric machine.

Solution to Problem

To solve the problem described above and achieve the object, the rotary electric machine according to an aspect of the present invention includes a rotor, a stator, and an insulator. The rotor rotates about an axis. The stator is formed by annularly combining a plurality of cores around each of which an electric wire is wound and is placed on the outer side of the rotor in a direction orthogonal to the axis. The insulator includes an outer portion placed on the outer side in a radial direction of the stator; an inner portion placed on the inner side in the radial direction of the stator; a trunk portion. coupling the outer portion and the inner portion, the electric wire being wound around the trunk portion; a recess portion formed in a portion of the outer portion that faces the inner portion to accommodate the electric wire; and a wall placed at the recess portion on the side of the inner portion to partially cover the recess portion. The insulator is attached to one end portion of the cores in a direction parallel with the axis.

Advantageous Effects of Invention

The present invention can provide a rotary electric machine that can inhibit lowering of a voltage at which discharge is started in a winding disposed on a core of a stator of the rotary electric machine.

DESCRIPTION OF EMBODIMENTS

A rotary electric machine and an insulator for a rotary electric machine according to exemplary embodiments of the present invention will be described below in detail with reference to the drawings. The present invention is not limited to the embodiments described below.

Embodiment.

In an embodiment, as long as a rotary electric machine includes a stator including a stator core around which an electric wire is wound, the type of rotary electric machine is not limited. Additionally, a rotary electric machine is not limited to a motor, i.e., a device to generate power, and may be a generator, which generates electric power.

Figure 1:
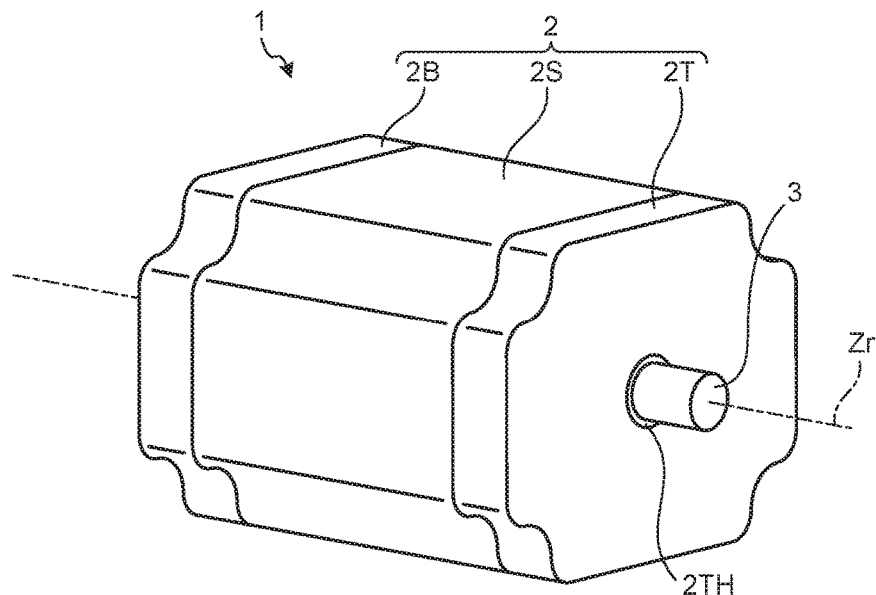
FIG. 1 is a perspective view of a rotary electric machine according to an embodiment.
Figure 2:
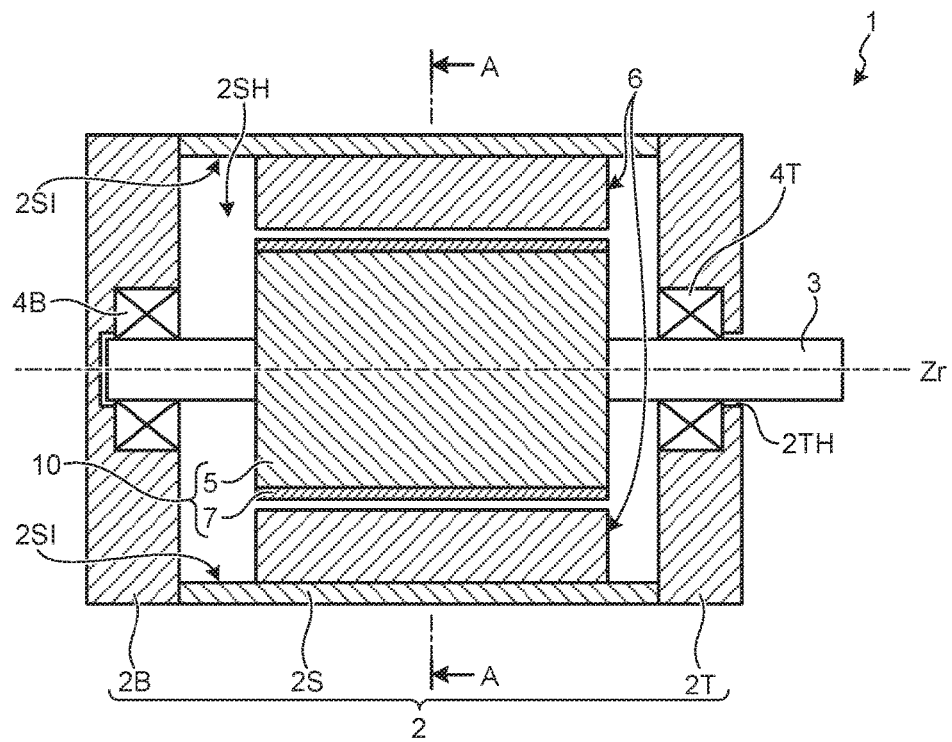
FIG. 2 a sectional view of the rotary electric machine according to the embodiment as cut along a plane that is parallel with a rotation axis and passes through the rotation axis.

FIG. 1 is a perspective view of a rotary electric machine according to the embodiment. FIG. 2 is a sectional view of the rotary electric machine according to the embodiment as cut along a plane that is parallel with the rotation axis and passes through the rotation axis. As illustrated in FIG. 1, a rotary electric machine 1 includes a housing 2 and a shaft 3. As illustrated in FIG. 2, the housing 2 houses a pair of bearings 4T and 4B that support the shaft 3; a stator 6; and a rotor 10 that includes a rotor core 5 to which the shaft 3 is attached and permanent magnets 7 attached to the rotor core 5. The rotor core 5 is attached to the shaft 3. The shaft 3 and the rotor 10 rotate about an axis Zr. The axis Zr is referred to as a rotation center axis Zr as appropriate hereinafter.

The housing 2 includes a tubular side portion 2S; a first flange 2T attached to one end portion of the side portion 2S; and a second flange 2B attached to the other end portion of the side portion 2S. As illustrated in FIG. 2, the side portion 2S has a through hole 2SH, which penetrates the side portion 2S in a direction parallel with the rotation center axis Zr of the shaft 3 and the rotor 10. In the embodiment, the side portion 2S is in the shape of a quadratic prism with its four corners formed in curved surfaces protruding toward the rotation center axis Zr, although the shape of the side portion 2S is not limited to such a shape.

The stator 6 is attached to an inner surface 2SI of the side portion 2S. The inner surface 2SI of the side portion 2S has a circular section when cut along a plane orthogonal to the rotation center axis Zr. The stator 6 is placed in the through hole 2SH of the side portion 2S. The rotor 10 is placed inside the stator 6. The through hole 2SH of the side portion 2S is closed with the first flange 2T, which is attached to the one end portion of the side portion 2S, and the second flange 2B, which is attached to the other end portion of the side portion 2S. The stator 6 and the rotor 10 are housed in a space surrounded by the side portion 2S, the first flange 2T, and the second flange 2B, that is, inside the through hole 2SH.

The first flange 2T has a hole 2TH, which the shaft 3, to which the rotor core 5 is attached, passes through. The bearing 4T is attached in the hole 2TH of the first flange 2T. The bearing 4B is attached to the second flange 2B. Since one end portion and the other end portion of the shaft 3 are supported by the bearings 4T and 4B as described above, the shaft 3 and the rotor 10 are supported by the first flange 2T and the second flange 2B through the bearings 4T and 4B. In the embodiment, the bearings 4T and 4B are ball bearings, although this is not a limitation.

Figure 3:
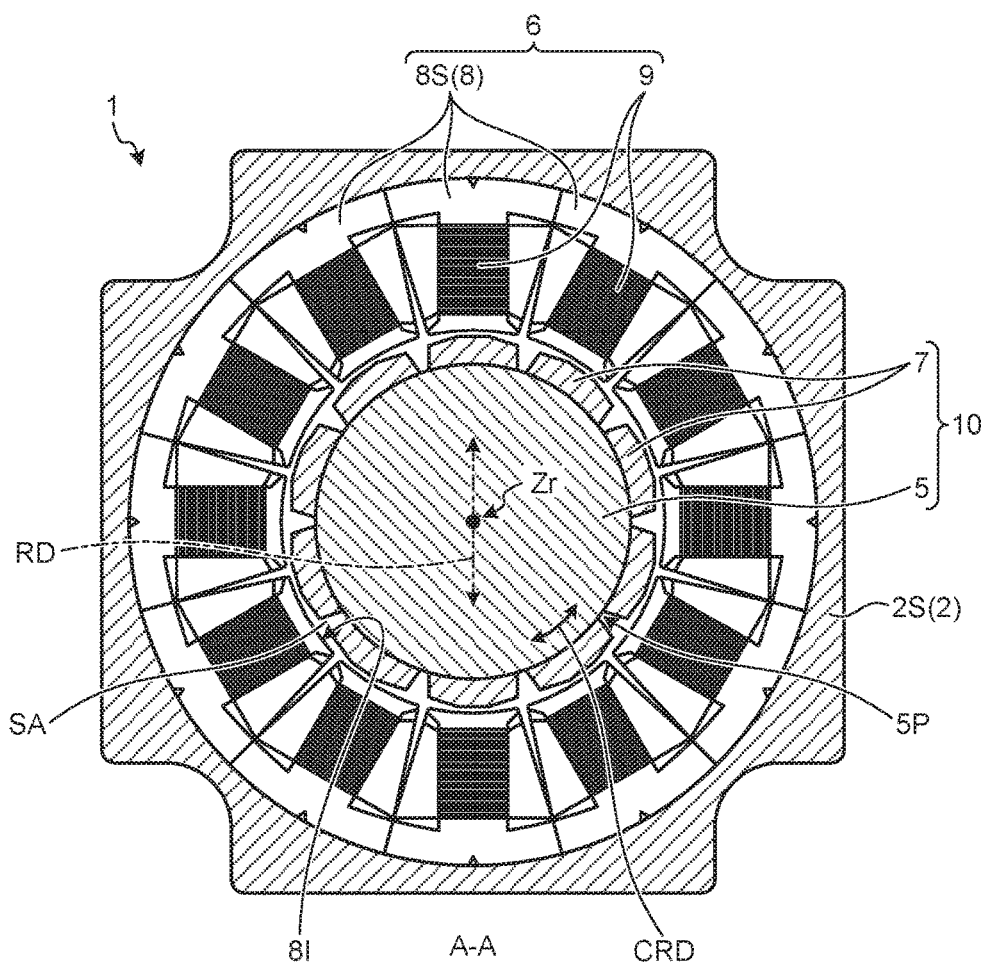
FIG. 3 is a view along arrows A-A in FIG. 2.

FIG. 3 is a view along arrows A-A in FIG. 2. FIG. 3 is a section of the rotary electric machine 1 cut along a plane orthogonal to the rotation center axis Zr, as viewed from a direction of the arrows A FIG. 2. The stator 6 includes a stator core 8 and windings 9, which are formed by winding electric wires around the teeth of the stator core 8. The stator core 8 is an annular structure formed by combining a plurality of cores 8S annularly. In the embodiment, the number of the cores 8S that constitute the stator core 8 is 12, although the number of the cores 8S that constitute the stator core 8 is not limited. Each of the cores 8S that constitute the stator core 8 is formed by stacking a plurality of disks made from magnetic steel sheets, which are magnetic materials. The stator 6 is formed by combining annularly the cores 8S, on each of which the winding 9 is disposed, and placed on the outer side of the rotor 10 in a direction orthogonal to the rotation center axis Zr, that is, in the radial direction of the stator core 8.

The rotor 10 is placed inside the stator core 8, which is the annular structure, in the radial direction. The radial direction is a direction indicated by an arrow RT) in FIG. 3, and it is the direction orthogonal to the rotation center axis Zr of the rotor 10. The rotor core 5 of the rotor 10 is a cylindrical structure. The rotor core 5 is formed by stacking a plurality of disks made from magnetic steel sheets, which are magnetic materials. The permanent magnets 7 are attached to an outer circumferential surface 5P of the rotor core 5. The permanent magnets 7 are arrayed in a direction CRD, which is along the circumference of the rotor core 5, such that the north poles and the south poles alternate. In the embodiment, the number of the permanent magnets 7 included in the rotor 10 is 10, although the number of the permanent magnets 7 included in the rotor 10 is not limited.

In the embodiment, the permanent magnets 7 are attached to the rotor core 5 by bonding, although the method of attaching the permanent magnets 7 to the rotor core 5 is not limited to this. In the embodiment, the permanent magnets 7 are attached to the outer circumferential surface 5S of the rotor core 5, although the permanent magnets 7 may be attached in holes that penetrate through the rotor core 5 in a direction of the rotation center axis Zr.

Figure 4:
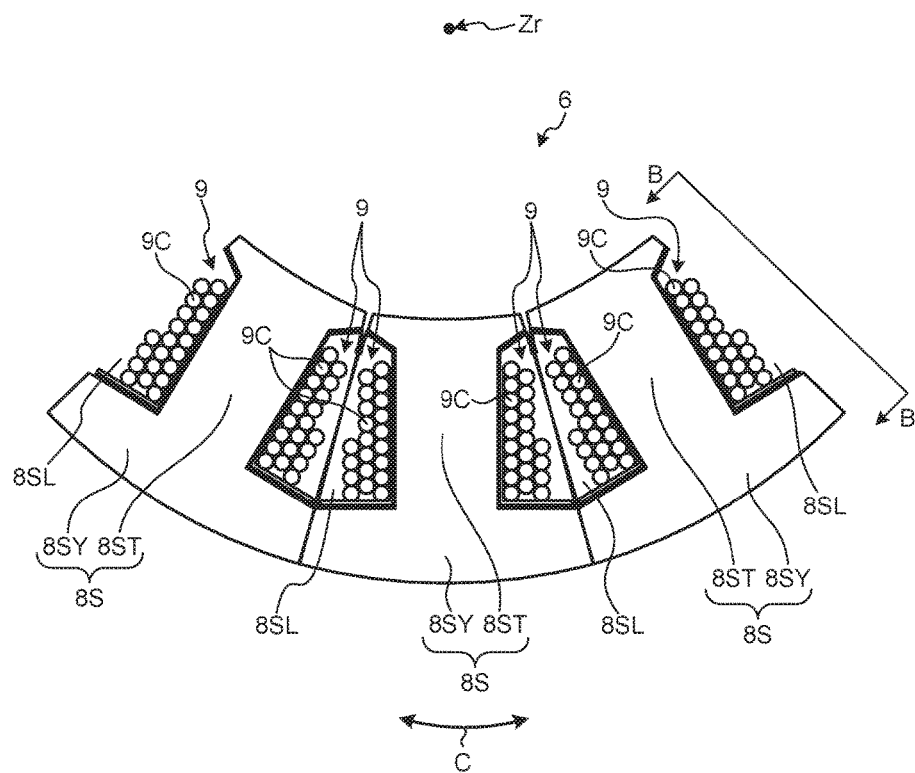
FIG. 4 is a plan view of a stator core according to the embodiment.

FIG. 4 is a plan view of the stator core according to the embodiment. Each of the cores 8S constituting the stator core 8, which is the annular structure, includes a yoke 8SY and a tooth 8ST. The central axis of the stator core 8, which is the annular structure, is the rotation center axis Zr. The shape of the yoke 8SY as viewed from the direction of the rotation center axis Zr is like an arc. The tooth 8ST protrudes from the inner circumferential portion of the arc of the yoke 8SY toward the rotation center axis Zr. The cores 8S constitute the annular stator core 8 with the ends of the arc-like yokes 8SY combined with one another. As illustrated in FIG. 4, the winding 9 is formed by winding an electric wire 9C around the tooth 8ST of each of the cores 8S. The winding 9 is housed in a slit 8SL formed by the teeth 8ST of two neighboring cores 8S.

Figure 5:
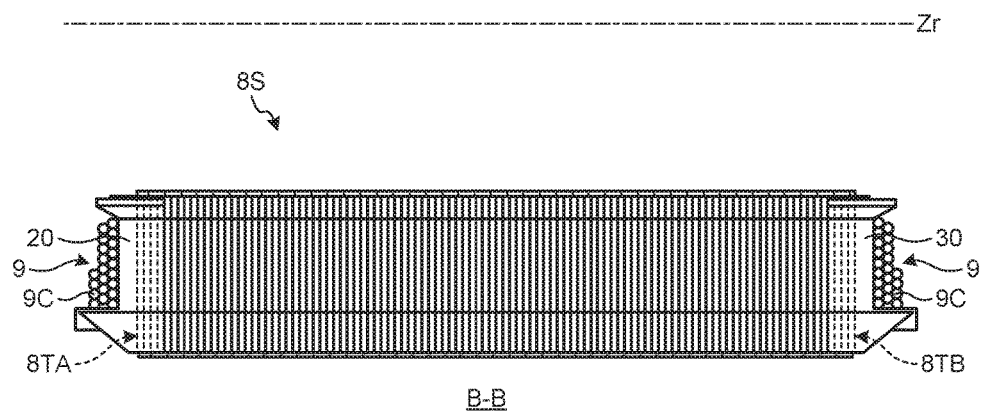
FIG. 5 is a view along arrows B-B in FIG. 4.

FIG. 5 is a view along arrows B-B in FIG. 4. An insulator 20, which is an insulator for a rotary electric machine, is attached to one end portion 8TA of each of the cores 8S in the direction parallel with the rotation center axis Zr of the rotor 10, and an insulator 30, which is an insulator for a rotary electric machine, is attached to the other end portion 8TB of each of the cores 8S. The insulators 20 and 30 provide isolation between the core 8S and the winding 9. The winding 9 is formed by winding the electric wire 9C around the core 8S and the insulators 20 and 30. In the embodiment, the insulators 20 and 30 are each an integrated component produced by injection molding of a resin, although the insulators 20 and 30 may be made from any material by any production method as long as they provide electrical isolation between each of the cores 8S and the winding 9.

Figure 6:
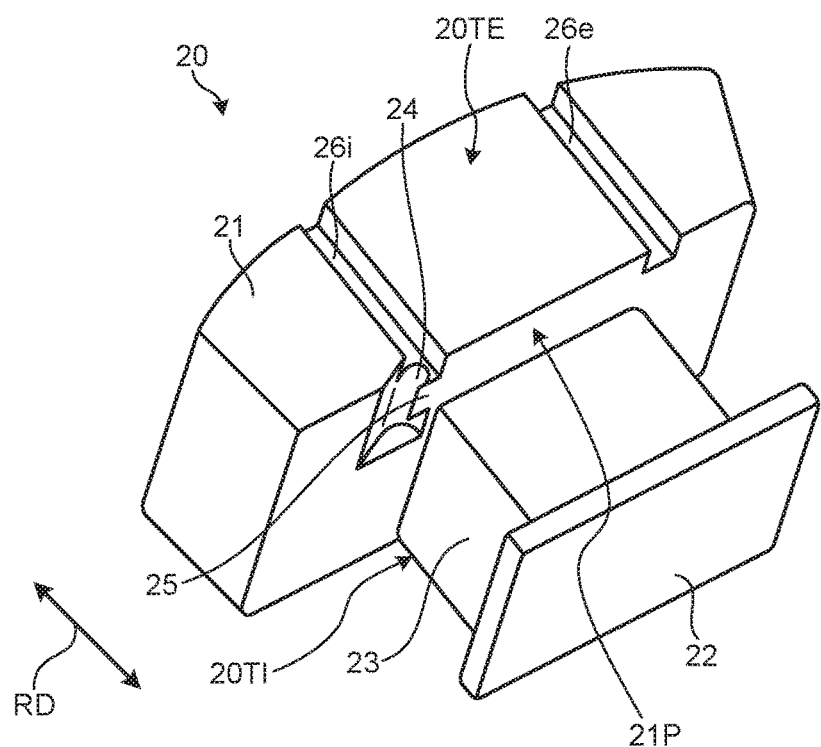
FIG. 6 is a perspective view illustrating an insulator according to the embodiment.
Figure 7:
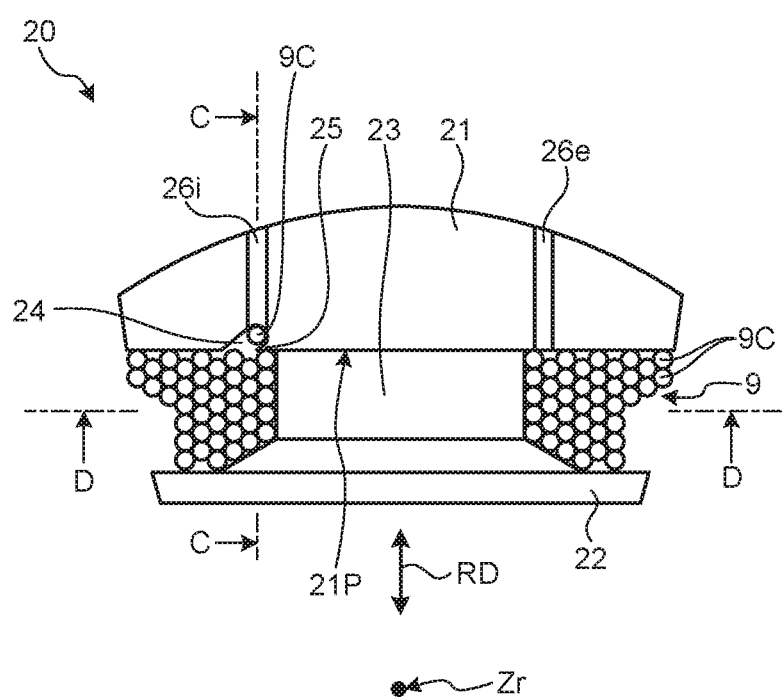
FIG. 7 is a front view illustrating the insulator according to the embodiment.
Figure 8:
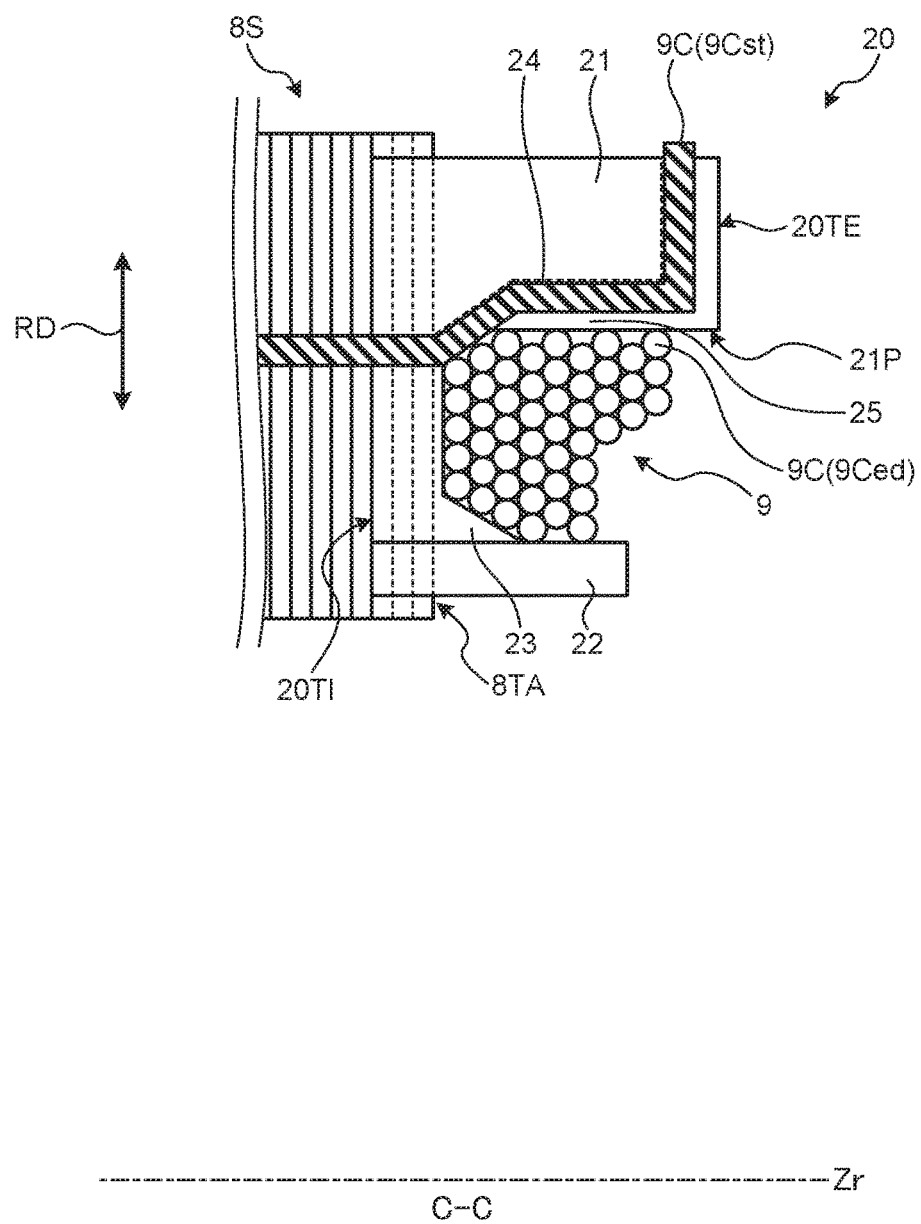
FIG. 8 is a view along arrows C-C in FIG. 7.
Figure 9:
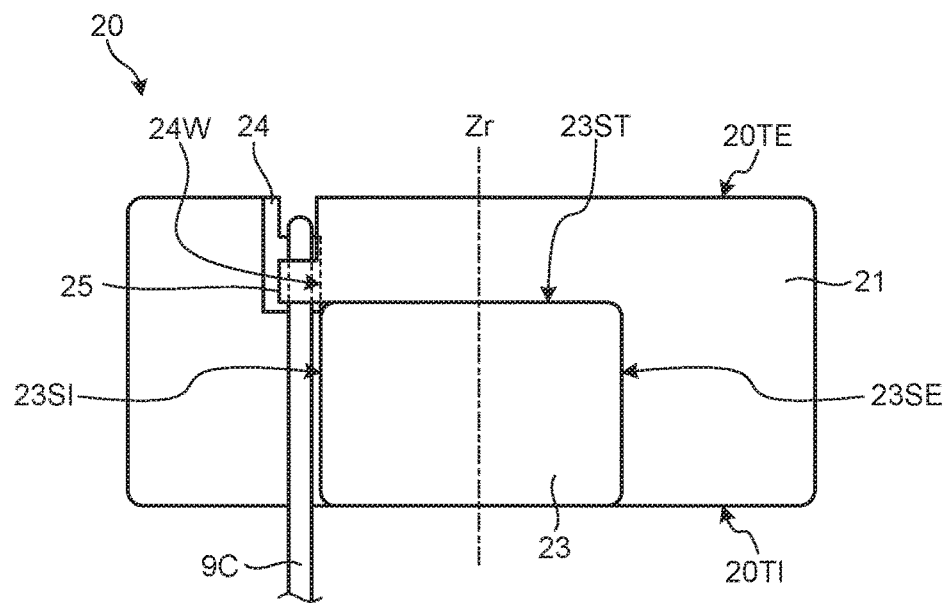
FIG. 9 is a view along arrows D-D in FIG. 7.

FIG. 6 is a perspective view illustrating the insulator according to the embodiment. FIG. 7 is a front view illustrating the insulator according to the embodiment. FIG. 8 is a view along arrows C-C in FIG. 7. FIG. 9 is a view along arrows D-D in FIG. 7. The insulator 20, which is attached to the one end portion 8TA of each of the cores 8S, includes an outer portion 21, which is placed on the outer side in the radial direction RD of the stator 6 illustrated in FIGS. 3 and 4; an inner portion 22, which is placed on the inner side in the radial direction of the stator 6; a trunk portion 23, which couples the outer portion 21 and the inner portion 22 and around which the electric wire 9C is wound; a recess portion 24, which is formed in a portion in which the outer portion 21 faces the inner portion 22 and which accommodates the electric wire 9C; and a wall 25, which is placed at the recess portion 24 on the side of the inner portion 22 and covers the recess portion 24 partially. In the embodiment, the insulator 20 further includes a first recess portion 26*i* for introducing the electric wire 9C that forms the winding 9 into the core 8S illustrated in FIG. 5, and a second recess portion 26*e* for drawing the electric wire 9C that is wound around the core 8S to the outside of the core 8S.

The one end portion 8TA of the core 8S, to which the insulator 20 is attached, is an end portion on the side on which the electric wire 9C that forms the winding 9 is introduced into the core 8S and on which the electric wire 9C that is wound around the cores 8S and the insulators 20 and 30 is drawn out of the core 8S. The insulator 30, which is attached to the other end portion 8TB of the core 8S, may have a configuration different from that of the insulator 20 or may be the insulator 20.

In the embodiment, the outer portion 21 includes the recess portion 24 on the side that faces the inner portion 22 as illustrated in FIG. 6. The recess portion 24 is set back toward the outer side of the stator 6 in the radial direction RD and opens to the side of the outer portion 21 that faces the inner portion 22 and to an outer end 20TE of the insulator 20. The wall 25 hangs over the opening of the recess portion 24 to partially cover the recess portion 24. As illustrated in FIG. 7, the recess portion 24 accommodates the electric wire 9C that forms the winding 9.

The recess portion 24 is set back toward the outer portion 21; thus, when the electric wire 9C is accommodated in the recess portion 24, the accommodated portion of the electric wire 9C is located on the outer portion 21 side as illustrated in FIGS. 7 and 8. That is, the position of the electric wire 9C that is accommodated in the recess portion 24 is on the outer portion 21 side of a facing surface 21P of the outer portion 21 that faces the inner portion 22. The facing surface 21P is a portion that comes in contact with the electric wire 9C that is wound around the trunk portion 23 of the insulator 20; thus, the electric wire 9C that is accommodated in the recess portion 24 and located on the outer portion 21 side of the facing surface 21P is prevented from coming in contact the electric wire 9C that is wound around the trunk portion 23 of the insulator 20. Furthermore, the recess portion 24 is partially covered by the wall 25. Thus, as illustrated in FIGS. 7, 8, and 9, the electric wire 9C that is accommodated in the recess portion 24 is prevented from coming in contact with the electric wire 9C that is wound around the trunk portion 23 of the insulator 20 by the wall 2S more reliably.

As illustrated in FIG. 8, a portion of the electric wire 9C that forms the winding 9 and is introduced into the insulator 20 is referred to as an introduction-portion electric wire 9Cst, and a portion of the electric wire 9C that is the winding end portion of the winding 9 is referred to as a last-turn electric wire 9Ced as appropriate. The winding 9 that is wound around any one of the cores 8S illustrated in FIGS. 4 and 5 has the lowest electric potential at the introduction-portion electric wire 9Cst and the highest electric potential at the last-turn electric wire 9Ced. Accordingly, the potential difference is the largest between the introduction-portion electric wire 9Cst and the last-turn electric wire 9Ced at the insulator 20. If the partial discharge inception voltage, i.e., a voltage at which discharge is started between the intro- duction-portion electric wire 9Cst and the last-turn. electric wire 9Ced, is lowered, the probability that a short circuit occurs between the two is increased; thus, it is preferable that reliable isolation is provided. between the introduction- portion electric wire 9Cst and the last-turn electric wire 9Ced.

As described above, in the insulator 20, contact between the introduction-portion electric wire 9Cst and the last-turn electric wire 9Ced is prevented by the recess portion 24 and the wall 25, and the distance equivalent to at least the thickness of the wall 25 is provided between the introduc- tion-portion electric wire 9Cst and the last-turn electric wire 9Ced. Furthermore, the wall 25, which is made from an insulating material, is present between the introduction- portion electric wire 9Cst and the last-turn electric wire 9Ced. With such a structure, the insulator 20 provides isolation between the introduction-portion electric wire 9Cst and the last-turn electric wire 9Ced reliably and thereby can inhibit lowering of the partial discharge inception voltage. As a result, the insulator 20 can inhibit lowering of a voltage at which discharge is started in the winding 9 disposed on the stator core 8 of the rotary electric machine 1.

The isolation between the introduction-portion electric wire 9Cst and the last-turn electric wire 9Ced can also be provided reliably by attaching an insulating tube to the last-turn electric wire 9Ced. However, the work to attach an insulating tube to the last-turn electric wire 9Ced requires time and effort, and furthermore, the material cost for the insulating tube is required, leading to increased manufac- turing costs for the stator 6 and the rotary electric machine 1. When the winding 9 is attached to each of the cores 8S on which the insulator 20 is disposed, the electric wire 9C is accommodated in the recess portion 24, the electric wire 9C is wound around each of the cores 8S, and then the last-turn electric wire 9Ced is simply drawn out of the insulator 20; thus, there is no need to attach an insulating tube to the last-turn electric wire 9Ced. Thus, using the cores 8S on each of which the insulator 20 is disposed inhibits an increase in manufacturing costs of the stator 6 and the rotary electric machine 1. Furthermore, since the introduction- portion electric wire 9Cst is placed on the outer portion 21 side, the introduction-portion electric wire 9Cst can be prevented from protruding from the facing surface 21P of the outer portion 21. As a result, a winding irregularity of the winding 9 is inhibited and the occupancy of the winding 9 is improved, and thus, the performance of the rotary electric machine 1 is improved.

In the embodiment, as illustrated in FIGS. 6 and 9, the recess portion 24 and the wall 25 extend from the outer end 20TE of the insulator 20 toward an attachment end 20TI. The attachment end 20TI is a part of the insulator 20 and is a portion at which the insulator 20 is attached to the core 8S illustrated in FIG. 8. As illustrated in FIG. 9, the recess portion 24 and the wall 25 extend in the direction parallel with the rotation center axis Zr.

As illustrated in FIG. 9, the trunk portion 23 of the insulator 20 includes a side surface 23SI on the side on which the electric wire 9C is introduced into the insulator 20, a side surface 23SF on the side on which the electric wire 9C is drawn out of the insulator 20, and a side surface 23ST on the side of the outer end 20TE of the insulator 20. Of the side surfaces 23SI, 23SE, and 23ST, the side surface 23SI on the side on which the electric wire 9C is introduced into the insulator 20 is parallel with the rotation center axis Zr. The direction from the side surface 23SI on the side on which the electric wire 9C is introduced into the insulator 20 to the side surface 23SE on the side on which the electric wire 9C is drawn out of the insulator 20 or its opposite direction is referred to as a width direction W of the insulator 20.

A recess-portion inner wall surface 24W in the recess portion 24 illustrated in FIG. 9 restricts the position of the electric wire 9C in the width direction W of the insulator 20 within the recess portion 24. In the embodiment, the position of the recess-portion inner wall surface 24W is aligned with the position of the side surface 23SI in the width direction W of the insulator 20. With such a structure, bending of the electric wire 9C from the recess portion 24 to the trunk portion 23 can be inhibited by winding the electric wire 9C around the insulators 20 and 30 and the core 8S while keeping the electric wire 9C pressed against the recess-portion inner wall surface 24W within the recess portion 24. By inhibiting the bending of the electric wire 9C, detachment of a first turn of the winding 9 resulting from a bending of the electric wire 9C can be inhibited when the electric wire 9C is wound around the insulators 20 and 30 and the core 8S. Thus, the insulator 20 can inhibit contact between the first turn and a last turn of the winding 9.

Figure 10:
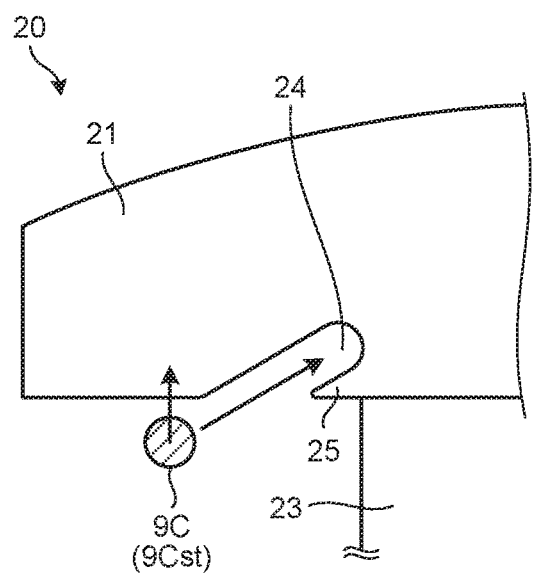
FIG. 10 is a diagram illustrating an electric wire being wound around the insulator.
Figure 11:
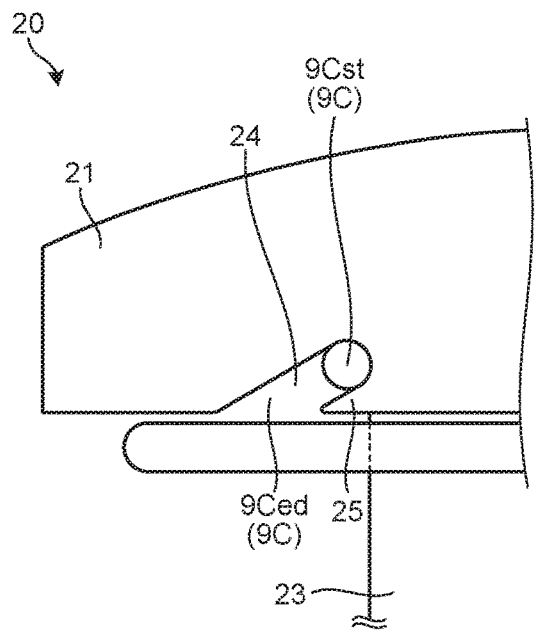
FIG. 11 is a diagram illustrating the electric wire being wound around the insulator.
Figure 12:
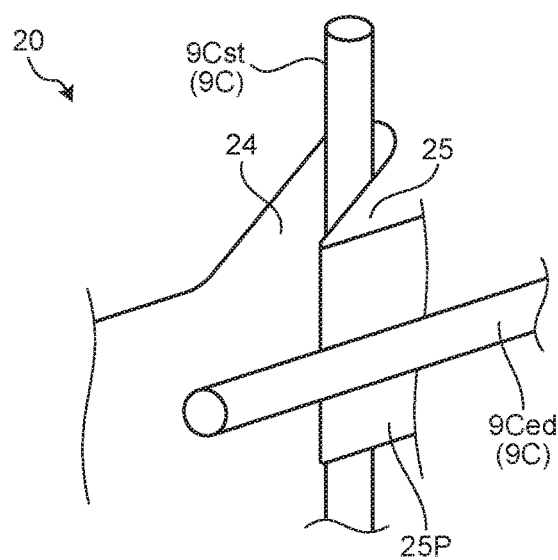
FIG. 12 is a diagram illustrating the electric wire being wound around the insulator.

FIGS. 10, 11, and 12 are diagrams illustrating an electric wire being wound around the insulator. As illustrated in FIG. 10, when the electric wire 9C is wound around the insulator 20, the electric wire 9C is moved toward the trunk portion 23 with the electric wire 9C pressed against the outer portion 21. Then, the electric wire 9C is introduced into the recess portion 24. The electric wire 9C in the recess portion 24 is the introduction-portion electric wire 9Cst described above. The winding 9 is wound around the insulators 20 and 30 and the core 8S illustrated in FIG. 5 while retained in the recess portion 24.

As illustrated in FIGS. 11 and 12, the last-turn electric wire 9Ced of the winding 9 crosses the introduction-portion electric wire 9Cst, which is in the recess portion 24, with the wall 25 therebetween. Since contact between the last-turn electric wire 9Ced and the introduction-portion electric wire 9Cst is prevented in this manner, the recess portion 24 and the wall 25 of the insulator 20 can inhibit the lowering of the partial discharge inception voltage of the winding 9.

Figure 13:
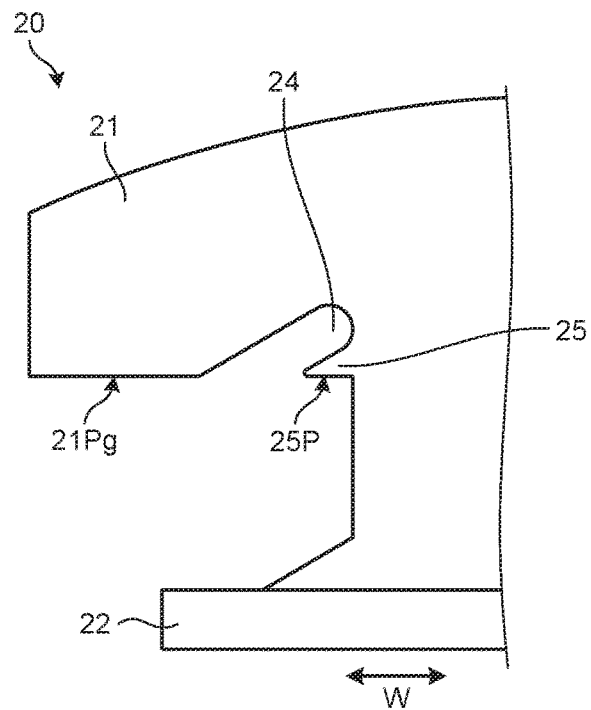
FIG. 13 is a diagram for describing a surface of an outer portion that faces an inner portion of the insulator according to the embodiment.

FIG. 13 is a diagram for describing a surface of the outer portion that faces the inner portion of the insulator according to the embodiment. The outer portion 21 of the insulator 20 includes, as the surface that faces the inner portion 22, a surface 25P, which is a portion of the wall 25, and a surface 21Pg, which is on the outer side of the recess portion 24 in the width direction W of the insulator 20. The surface 21Pg is a surface with which the electric wire 9C comes in contact when the electric wire 9C is introduced into the recess portion 24. In the embodiment, the position of the surface 25P is coplanar with the position of the surface 21Pg. Such a structure reduces the amount of movement by which the electric wire 9C is moved from the surface 21Pg into the recess portion 24 and thus allows the electric wire 9C to be introduced into the recess portion 24 smoothly. Additionally, by causing the position of the surface 25P to be coplanar with the position of the surface 21Pg, the introduction-portion electric wire 9Cst can be prevented from protruding toward the facing surface 21P; thus, a winding irregularity of the winding 9 is inhibited reliably and a reduction in the occupancy of the winding 9 wound around the trunk portion 23 is inhibited.

Figure 14:
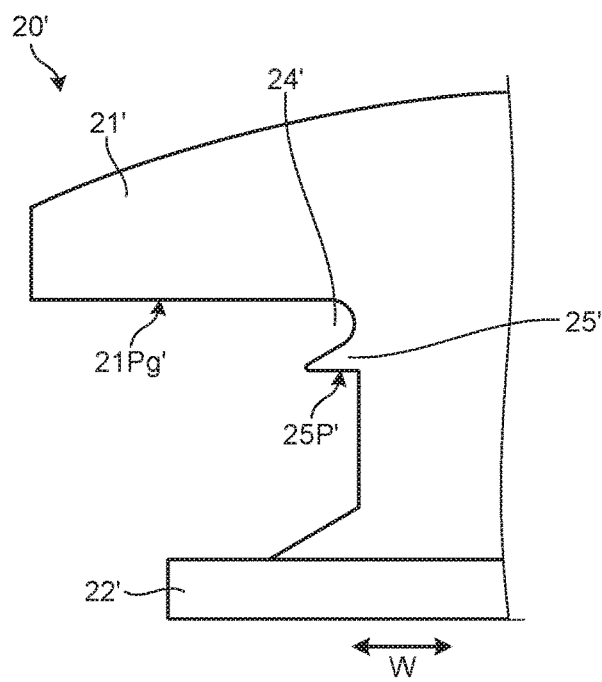
FIG. 14 is a diagram illustrating an insulator according to a first modification of the embodiment.

FIG. 14 is a diagram illustrating an insulator according to a first modification of the embodiment. A surface 25P' of a wall 25' of an insulator 20' according to the first modification is placed on an inner portion 22' side of a surface 21Pg'. The surface 21Pg' is a surface on the outer side of a recess portion 24' in the width direction W of the insulator 20'. Such a structure reduces the amount of movement by which the electric wire 9C is moved from the surface 21Pg' into the recess portion 24' so as to be smaller than that of the insulator 20 according to the embodiment and thus allows the electric wire 9C to be introduced into the recess portion 24' further smoothly.

As is the case with the insulator 20 according to the embodiment, the insulator 20' also provides isolation between the introduction-portion electric wire 9Cst and the last-turn electric wire 9Ced reliably with the recess portion 24' and the wall 25' and thereby can inhibit the lowering of the partial discharge inception voltage. As a result, the insulator 20' can also inhibit the lowering of the voltage at which discharge is started in the winding 9 disposed on the stator core 8 of the rotary electric machine 1. Additionally, the insulator 20' also does not require a tube to be attached to the last-turn electric wire 9Ced and thereby inhibits increase in manufacturing costs for the stator 6 and the rotary electric machine 1.

Figure 15:
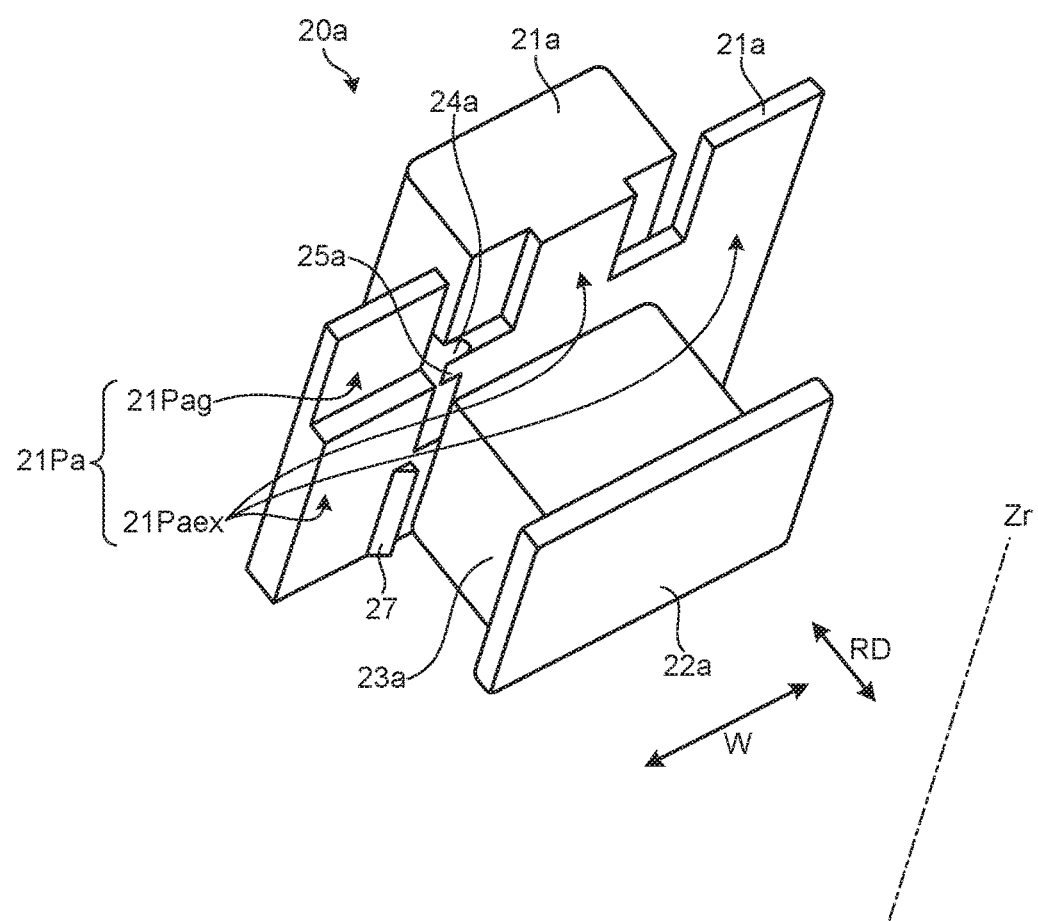
FIG. 15 is a perspective view illustrating an insulator according to a second modification of the embodiment.

FIG. 15 is a perspective view illustrating an insulator according to a second modification of the embodiment. While an insulator 20a according to the second modification is similar to the insulator 20 according to the embodiment, the insulator 20a is different in the position of a surface 21Pag on the outer side of a recess portion 24a in the width direction W of the insulator 20a and the presence of a ridge 27 disposed on a facing surface 21Pa. Other parts of the structure of the insulator 20a are similar to those of the insulator 20.

As illustrated in FIG. 15, of the facing surface 21Pa of an outer portion 21a that faces the inner portion, the portion 21Pag, which is located on the outer side of the recess portion 24a in the width direction W of the insulator 20a, is placed on the outer side of a portion 21Paex, which is other than the portion 21Pag, in the radial direction RD of the stator 6. The portion 21Pag, which is on the outer side of the recess portion 24a in the width direction W of the insulator 20a , is referred to as an introduction surface 21Pag as appropriate, and the portion 21Paex, which is other than the portion 21Pag, is referred to as an facing surface 21Paex as appropriate, hereinafter.

Figure 16:
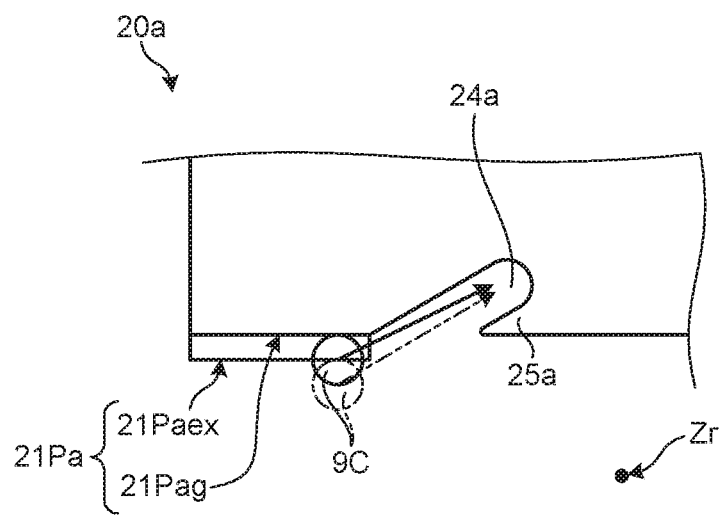
FIG. 16 is a partially enlarged diagram of the insulator according to the second modification of the embodiment.

FIG. 16 is a partially enlarged diagram of the insulator according to the second modification of the embodiment. The electric wire 9C that is illustrated with a solid line in FIG. 16 indicates the electric wire 9C being introduced into the recess portion 24a when the introduction surface 21Pag is placed on the outer side of the facing surface 21Paex in the radial direction RD of the stator 6, that is, when the insulator 20a is used. The electric wire 9C that is illustrated with a chain double-dashed line in FIG. 16 indicates the electric wire 9C being introduced into the recess portion 24a when the introduction surface 21Pag and the facing surface 21Paex are coplanar with each other.

When the introduction surface 21Pag is placed on the outer side of the facing surface 21Paex in the radial direction RD of the stator 6, the introduction angle at which the electric wire 9C is introduced into the recess portion 24a from the surface 21Pag is lessened in comparison with the case in which the introduction surface 21Pag and the facing surface 21Paex are coplanar with each other. In comparison with a larger introduction angle, a reduced introduction angle leads to the electric wire 9C moving a shorter distance when it moves to the recess portion 24a. That is, a reduced introduction angle reduces a rapid motion of the electric wire 9C and thereby can reduce the probability that the electric wire 9C comes off the recess portion 24a during the introduction of the electric wire 9C into the recess portion 24a. As a result, the insulator 20a can introduce the electric wire 9C into the recess portion 24a reliably and thereby can inhibit reduction in productivity of the stator 6 and the rotary electric machine 1.

Figure 17:
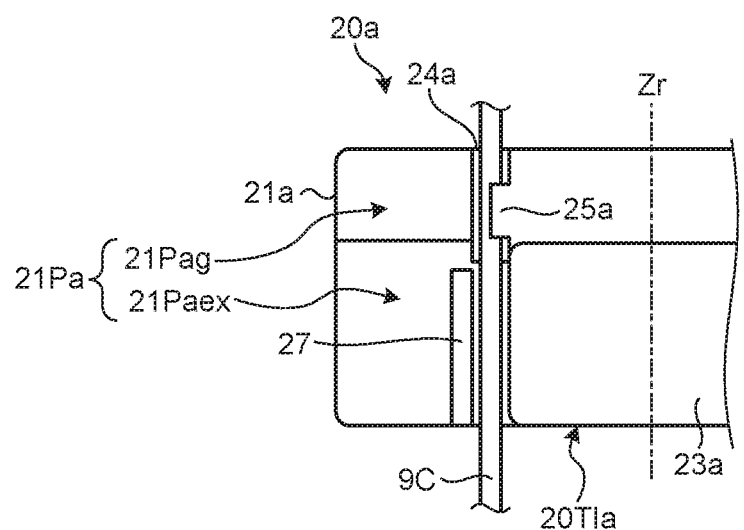
FIG. 17 is a diagram of the insulator according to the second modification of the embodiment as viewed from the inner portion side.

FIG. 17 is a diagram of the insulator according to the second modification of the embodiment as viewed from the inner portion side. As illustrated in FIGS. 15 and 17, the facing surface 21Pa of the insulator 20a, which is a surface of the outer portion 21a that corresponds to an inner portion 22a, includes the ridge 27, which protrudes toward the inner portion 22a along the direction parallel with the rotation center axis Zr, in a position that is on the outer side of the recess portion 24a and beyond the recess portion 24a in its extending direction. The ridge 27 protrudes from the facing surface 21Paex, which is located on the facing surface 21Pa on the attachment end 20TIa side of the introduction surface 21Pag.

The ridge 27 faces a trunk portion 23a. In the present modification, the shape of the section of the ridge 27 orthogonal to the direction in which the ridge 27 extends is a triangle. A portion of the ridge 27 that faces the trunk portion 23a has the largest amount of protrusion from the facing surface 21Paex, and a portion of the ridge 27 that is located farther away from the trunk portion 23a has a smaller amount of protrusion from the facing surface 21Paex. The electric wire 9C is moved over the ridge 27 from a portion of the ridge 27 that has a small amount of protrusion so as to be accommodated between the ridge 27 and the trunk portion 23a; thus, ease with which the electric wire 9C is moved over the ridge 27 is improved. The shape of the section of the ridge 27 described above is not limited to a triangle, and it may be a rectangle, a circle, an oval, or a triangular shape having a curved oblique side.

Such a structure allows the electric wire 9C that is accommodated in the recess portion 24a to be wound around the insulator 20a along the ridge 27 and thereby fixes the position of the electric wire 9C that is the first turn of the winding 9. Thus, the insulator 20a having the ridge 27 can inhibit a winding irregularity of the winding 9 and inhibit the electric wire 9C that is the first turn from leaving from the wall 25a and thereby can inhibit reduction in productivity of the stator 6 and the rotary electric machine 1.

In the present modification, the insulator 20a may have both of the structure in which the introduction surface 21Pag is placed on the outer side of the facing surface 21Paex in the radial direction RD of the stator 6 and the ridge 27; alternatively, the insulator 20a may have one of the two.

In the embodiment, the first modification, and the second modification, the insulators 20, 20', and 20a can be used for both of a laminated core formed by stacking a plurality of magnetic steel sheets and a core formed by molding powder of a magnetic material. Additionally, each of the insulators 20, 20', and 20a alone can, without processing the cores 8S, produce effects such as inhibition of lowering of a partial discharge inception voltage, inhibition of increase in manufacturing costs of the stator 6 and the rotary electric machine 1, and improvement of the occupancy of the winding 9.

In the embodiment, the first modification, and the second modification, the insulators 20, 20', and 20a respectively include the recess portions 24, 24', and 24a and the walls 25, 25', and 25a on one side thereof in the width direction W, although such a structure is not a limitation. The recess portions 24, 24', and 24a and the walls 25, 25', and 25a may be placed along the width direction W of the insulators 20, 20', and 20a, respectively.

Note that the configurations described in the foregoing embodiments are examples of the present invention; combining the present invention with other publicly known techniques is possible, and partial omissions or modifications are possible without departing from the spirit of the present invention.

REFERENCE SIGNS LIST 1 rotary electric machine, 2 housing, 3 shaft, rotor core, 6 stator, 7 permanent magnet, 8 stator core, 8S core, 8TA one end portion, 8TB other end portion, winding, 9C electric wire, 9Ced last-turn electric wire, 9Cst introduction-portion electric wire, 10 rotor, 20, 20', 20a, 30 insulator, 20TE outer end, 20TI attachment end, 21, 21', 21a outer portion, 21P, 21Pa facing surface, 21Pag surface (introduction surface), 21Paex surface (facing surface), 22, 22', 22a inner portion, 23, 23a trunk portion, 23SI, 23SE, 23ST, side surface, 24, 24', 24a recess portion, 24W recess-portion inner wall surface, 25, 25', 25a wall, 27 ridge.

The invention claimed is:
1. A rotary electric machine comprising:
a rotor that rotates about an axis;
a stator formed by annularly combining a plurality of cores around each of which an electric wire is wound and placed on an outer side of the rotor in a direction orthogonal to the axis; and
an insulator that includes an outer portion placed on an outer side in a radial direction of the stator; an inner portion placed on an inner side in the radial direction of the stator and having a groove portion that introduces the electric wire to the cores; a trunk portion coupling the outer portion and the inner portion, the electric wire being wound around the trunk portion; a recess portion formed in a portion of the outer portion that faces the inner portion and connected to the groove portion to accommodate the electric wire; and a wall placed at the recess portion on a side of the inner portion to partially cover the recess portion, the insulator being attached to one end portion of the cores in a direction parallel with the axis.

2. The rotary electric machine according to claim 1, wherein the recess portion and the wall extend in the direction parallel with the axis.

3. A rotary electric machine comprising:
a rotor that rotates about an axis; a stator formed by annularly combining a plurality of cores around each of which an electric wire is wound and placed on an outer side of the rotor in a direction orthogonal to the axis; and
an insulator that includes an outer portion placed on an outer side in a radial direction of the stator; an inner portion placed on an inner side in the radial direction of the stator; a trunk portion coupling the outer portion and the inner portion, the electric wire being wound around the trunk portion; a recess portion formed in a portion of the outer portion that faces the inner portion to accommodate the electric wire; and a wall placed at the recess portion on a side of the inner portion to partially cover the recess portion, the insulator being attached to one end portion of the cores in a direction parallel with the axis, wherein the recess portion and the wall extend in the direction parallel with the axis, and in a surface of the outer portion that corresponds to the inner portion, a portion that introduces the electric wire into the recess portion is placed on an outer side of a portion that is other than the portion that introduces the electric wire into the recess portion, in the radial direction of the stator.

4. The rotary electric machine according to claim 3, wherein the surface of the outer portion that faces the inner portion includes a ridge protruding toward the inner portion along the direction parallel with the axis in a position that is on an outer side of the recess portion and beyond the recess portion in an extending direction of the recess portion.

5. An insulator for a rotary electric machine, the insulator being attached to an end portion of a stator of the rotary electric machine, the stator being formed by annularly combining a plurality of cores around each of which an electric wire is wound, the insulator comprising:
- an outer portion placed on an outer side in a radial direction of the stator and having a groove portion that introduces the electric wire to the cores;
- an inner portion placed on an inner side in the radial direction of the stator;
- a trunk portion coupling the outer portion and the inner portion, the electric wire being wound around the trunk portion;
- a recess portion formed in a portion of the outer portion that faces the inner portion and connected to the groove portion to accommodate the electric wire; and
- a wall placed at the recess portion on a side of the inner portion to partially cover the recess portion.

6. The insulator for a rotary electric machine according to claim 5, wherein the recess portion and the wall extend in a direction parallel with a central axis of the stator.

7. An insulator for a rotary electric machine, the insulator being attached to an end portion of a stator of the rotary electric machine, the stator being formed by annularly combining a plurality of cores around each of which an electric wire is wound, the insulator comprising:
- an outer portion placed on an outer side in a radial direction of the stator;
- an inner portion placed on an inner side in the radial direction of the stator;
- a trunk portion coupling the outer portion and the inner portion, the electric wire being wound around the trunk portion;
- a recess portion formed in a portion of the outer portion that faces the inner portion to accommodate the electric wire; and
- a wall placed at the recess portion on a side of the inner portion to partially cover the recess portion, wherein
- the recess portion and the wall extend in the direction parallel with a central axis of the stator, and
- in a surface of the outer portion that corresponds to the inner portion, a portion that introduces the electric wire into the recess portion is placed on an outer side of a portion that is other than the portion that introduces the electric wire into the recess portion, in the radial direction of the stator.

8. The insulator for a rotary electric machine according to claim 7, wherein the surface of the outer portion that faces the inner portion includes a ridge protruding toward the inner portion along the direction parallel with the central axis in a position that is on an outer side of the recess portion and beyond the recess portion in an extending direction of the recess portion.

9. A rotary electric machine comprising:
- a rotor that rotates about an axis;
- a stator formed by annularly combining a plurality of cores around each of which an electric wire is wound and placed on an outer side of the rotor in a direction orthogonal to the axis; and
- an insulator that includes an outer portion placed on an outer side in a radial direction of the stator; an inner portion placed on an inner side in the radial direction of the stator; a trunk portion coupling the outer portion and the inner portion, the electric wire being wound around the trunk portion; a recess portion formed in a portion of the outer portion that faces the inner portion to accommodate the electric wire; and a wall placed at the recess portion on a side of the inner portion to partially cover the recess portion, the insulator being attached to one end portion of the cores in a direction parallel with the axis, wherein
- the recess portion and the wall extend in the direction parallel with the axis, and
- the surface of the outer portion that faces the inner portion includes a ridge protruding toward the inner portion along the direction parallel with the axis in a position that is on an outer side of the recess portion and beyond the recess portion in an extending direction of the recess portion.

10. An insulator for a rotary electric machine, the insulator being attached to an end portion of a stator of the rotary electric machine, the stator being formed by annularly combining a plurality of cores around each of which an electric wire is wound, the insulator comprising:
- an outer portion placed on an outer side in a radial direction of the stator;
- an inner portion placed on an inner side in the radial direction of the stator;
- a trunk portion coupling the outer portion and the inner portion, the electric wire being wound around the trunk portion;
- a recess portion formed in a portion of the outer portion that faces the inner portion to accommodate the electric wire; and
- a wall placed at the recess portion on a side of the inner portion to partially cover the recess portion, wherein
- the recess portion and the wall extend in the direction parallel with a central axis of the stator, and
- the surface of the outer portion that faces the inner portion includes a ridge protruding toward the inner portion along the direction parallel with the central axis in a position that is on an outer side of the recess portion and beyond the recess portion in an extending direction of the recess portion.

* * * * *